United States Patent Office 2,723,166
Patented Nov. 8, 1955

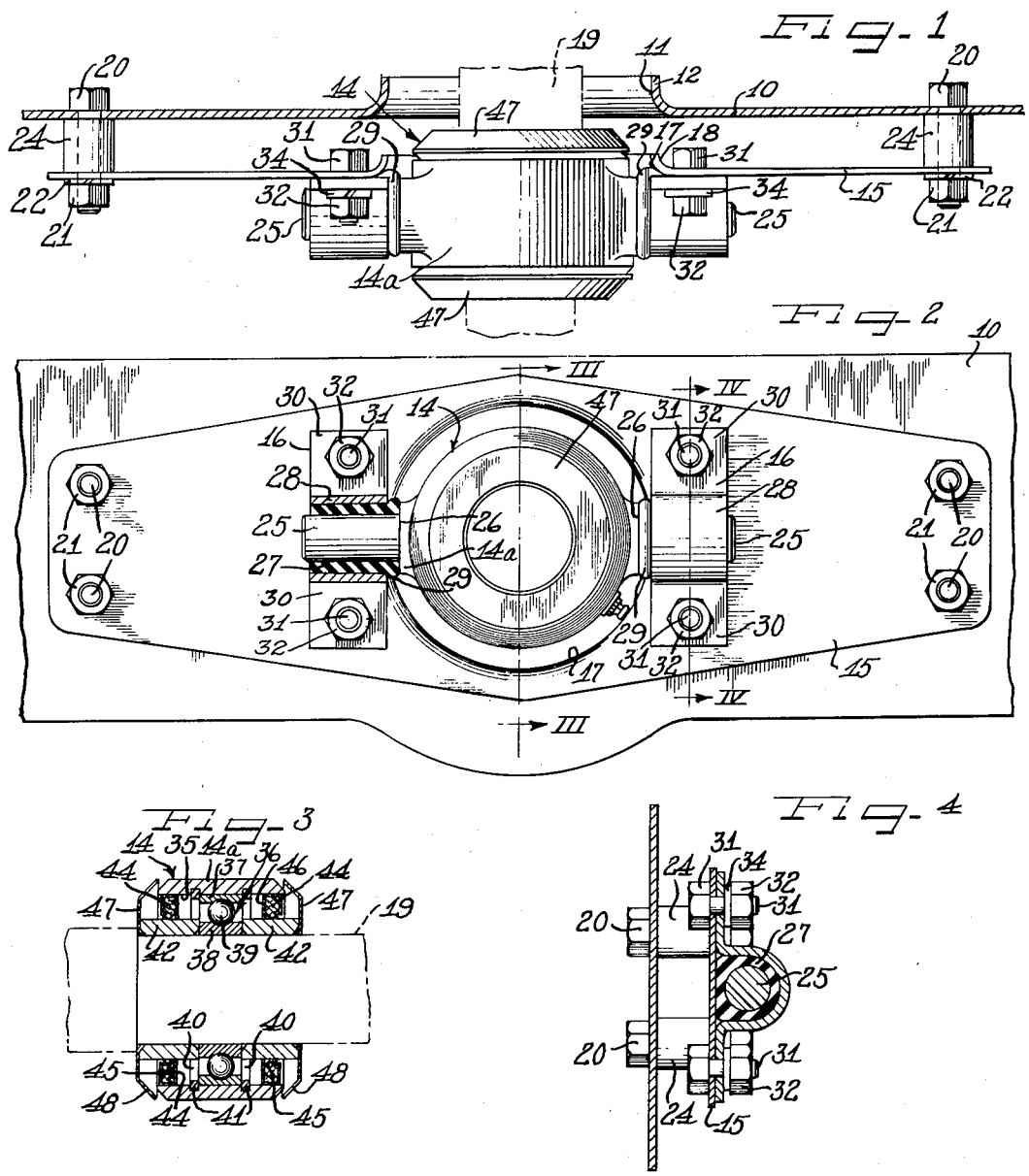

2,723,166

SHAFT BEARING HANGER

Albert W. Gair, Fraser, Mich., assignor to Thompson Products, Inc., Cleveland, Ohio, a corporation of Ohio Application June 19, 1951, Serial No. 232,408

4 Claims. (Cl. 308—28)

The present invention relates to an improved bearing hanger for resiliently and rotatably mounting a propeller shaft in a vehicle, and more particularly, the invention deals with a simplified shaft mounting assembly in which additional fore-and-aft movement of the propeller shaft is permitted by the provision of a resilient spring member in addition to resilient pre-loaded vibration damping mounts.

The bearing hanger assemblies of the present invention are particularly useful on motor vehicles requiring a propeller shaft made up of two or more sections. The hangers are utilized at or near the shaft junction points for supporting the shaft with respect to the vehicle frame. By the provision of an improved and simplified resilient mounting, the transmission of vibration from the shaft to the frame is substantially eliminated, and the noise level is materially reduced. Furthermore, a certain amount of shaft self-alignment is permitted to eliminate undesirable bearing loads.

In some uses a greater amount of fore-and-aft or axial movement of the propeller shaft is necessary in order to accommodate relatively greater movement of the vehicle engine on its rubber mounts. The shaft bearing hanger of the present invention is particularly adapted for this purpose by a spring mounting of the bearing housing from a transverse member which is secured at its end to a vehicle cross frame member. Thus, ordinary vibration damping is accomplished by a trunnion-type resilient mounting embodying resilient bushings while a greater amount of fore-and-aft shaft movement, in addition to the movement permitted by the resilient bushing, is accommodated by flexing of the spring member.

It is, therefore, an object of the present invention to provide an improved bearing hanger for resiliently mounting a rotated shaft.

Another object of the invention is to provide a simplified shaft bearing hanger for a vehicle embodying means for accommodating greater axial movement of the shaft.

A further object of the invention is to provide a simplified trunnion-mounted shaft bearing hanger for rotatably supporting a propeller shaft and including a spring member for permitting increased axial movement of the shaft.

An additional object of the invention is to provide a shaft bearing mount capable of ready assembly and embodying dual resilient means for securing the mount to a vehicle frame member.

Other objects, features and advantages of the present invention will be apparent from the following detailed description of one embodiment, by way of preferred example only, taken in conjunction with the accompanying drawings.

On the drawings:

Figure 1 is a fragmentary sectional view of a vehicle cross frame member showing a shaft bearing hanger drawn in elevation secured thereto.

Figure 2 is a fragmentary front elevational view, partly in section, of the frame member and bearing hanger of Figure 1.

Figure 3 is a sectional view taken along line III—III of Figure 2 and showing the bearing arrangement in the hanger housing.

Figure 4 is a sectional view taken along line IV—IV of Figure 2 and showing the details of one of the trunnion mounts.

As shown on the drawings:

In Figures 1 and 2 a vehicle cross frame member is designated by the reference numeral 10. A central aperture 11 is formed through the frame member and is defined by a continuous annular flange 12. A shaft mounting assembly or bearing hanger 14, including a housing 14a, is secured to a transverse flat spring member 15 by means of a pair of attachment brackets 16, 16. The hanger 14 is suspended in spaced relation in a central aperture 17 in the spring member which is defined by an annular continuous flange 18. The spring member is secured to the frame member in such a manner that the aperture 17 is aligned with the aperture 11. A driven propeller shaft 19 is rotatably mounted in the hanger 14 axially of the apertures 11 and 17.

In order to permit a substantial amount of axial or fore-and-aft movement of the shaft 19 and the bearing hanger 14, the spring member 15 is spaced from the frame member and has its opposite end portions fixedly secured to the frame member by means of bolts 20, nuts 21 and lock washers 22 with a spacer sleeve 24 provided on each of the bolts between the frame member 10 and the end portion of the spring member. Thus, it will be readily apparent that axial movement of the shaft 19 and the hanger 14 will be accommodated by deflection of the spring member without transferring the movement to the frame.

In accordance with the concepts of this invention, trunnion-type resilient mounting means are provided for damping shaft vibrations, for providing positive alignment between the shaft and the vehicle frame and for providing additional fore-and-aft resilience. To this end, the hanger housing 14a is provided with trunnion mounts in the form of a pair of oppositely extending gudgeons or bosses 25. A pair of annular shoulders 26, 26 are afforded at the junctures of the bosses 25 with the central portion of the housing. A resiliently yieldable bushing 27, formed of rubber or the like and D-shaped in end view, encircles each of the gudgeons 25 in substantially conforming relation thereabout with the inner edges of the rubber-like bushings abutting the shoulders 26 and with the flat faces abutting the opposing surface of the spring member 15. For retaining the bushings the brackets 16 are provided with central integral U-shaped bight portions 28 compressingly embracing the arcuate surfaces of the bushings 27. The bight portions pre-load the bushings and are spaced from the respective shoulders 26 so that generally annular beads or ribs 29 are bulged outwardly to prevent metal-to-metal contact between the brackets and the central portion of the housing. For fixedly securing the brackets 16 to the spring member 15 integral oppositely extending feet 30 are formed on the brackets, and bolts 31, nuts 32 and lock washers 34 are provided. Any pivoting of the housing is accommodated by shear or torsional twist in the bushings.

In order to rotatably mount the shaft 19 in the hanger 14 a central transverse bore 35 is formed therethrough. An anti-friction bearing 36, including an outer race 37, an inner race 38 and a plurality of ball bearings 39, has its outer race 37 secured in the bore 35 by means of a pair of snap rings 40 or the like inserted in annular grooves 41 formed in the defining wall of the bore 35 adjacent the sides of the outer race. The inner race 38 is disposed in conforming relation about a portion of the shaft 19 and is prevented from moving thereon by means of a pair of retaining collars 42, 42 secured to the shaft 19 as by being press fitted thereon and abutting the opposite sides of the inner race.

Sealing rings 44 are provided at the opposite end portions of the bore 35 and may comprise annular resilient portions 45, of rubber, felt or the like, substantially encased in sheet metal backing portions 46 which may be press fitted in the opposite ends of the bore. The backing portions 44 are maintained free of the collars 42 while the inward peripheral edges of the resilient portions 45 are slidingly disposed about these collars, thus providing a rotating seal.

In order to deflect flying pebbles, stones and the like, annular protective covers or dust covers 47, 47 may be secured about the shaft 19 at the axially outer edges of the collars 42. The dust covers 47 are formed with outer annular peripheral flanges 48 which are disposed in closely spaced relation with the edge portions of the housing 14a defining the bore 35.

From the foregoing description it will be readily seen that this invention provides an improved and simplified shaft bearing hanger for resiliently supporting a rotatable propeller shaft from a portion of a vehicle frame. Dual resilient mounting means are provided in the form of rubber-like bushings provided about the trunnion mounts and of a transverse spring member which is secured to the vehicle frame at its ends with the resilient bushings secured to the central portion of the spring member.

It will be understood that modifications and variations may be effected without departing from the scope of the novel concepts of the present invention.

I claim as my invention:

1. A hanger for resiliently and rotatably mounting a propeller shaft through an apertured cross frame member of a vehicle, comprising a housing having a central bore therethrough and a pair of integral oppositely extending gudgeons at right angles to said bore, a pre-loaded resiliently yieldable bushing about each of said gudgeons, a pair of attachment brackets including outwardly extending attachment feet and bight portions with the bight portions engagingly embracing said bushings in spaced relation to the housing, an elongated flattened spring member having a central aperture therethrough, bolt means fixedly securing the end portions of said spring member on opposite sides of said spring member aperture to one end of rigid axially extending spacer elements secured at their opposite ends to said frame member for fixedly spacing the ends of said spring member from said frame with the spring member aperture aligned with the frame member aperture, means fixedly securing said attachment feet to the central portion of said spring member to resiliently suspend said housing in spaced relation to the defining edges of the spring member aperture, an anti-friction bearing having an outer race and an inner race, means retaining the outer race of said bearing in said housing bore, and means for retaining the inner race of said bearing about said propeller shaft to rotatably support the shaft in the housing.

2. A hanger for resiliently and rotatably mounting a propeller shaft through an apertured cross frame member of a vehicle, comprising a housing having a central bore therethrough and outwardly extending bosses at right angles to said bore, a resilient bushing about each of said bosses, a plurality of attachment brackets having engagement portions about said bushings, an apertured spring member having its ends secured in fixed spaced relation to the frame member at points on diametrically opposite sides of the spring member aperture with the spring member aperture aligned with the frame member aperture, means fixedly securing said brackets to said spring member to resiliently suspend said housing in spaced relation to the defining edges of the spring member aperture, and a bearing retained in said housing bore and having a portion disposed about the propeller shaft to rotatably support the shaft in said housing, said spring member being deflectable to permit substantial axial movement of said housing and said shaft.

3. In a vehicle having a rotatable propeller shaft, a hanger for resiliently and rotatably supporting the shaft from a frame member, comprising a housing having a bore therethrough with means therein for rotatably supporting the shaft, said housing having a plurality of bosses at right angles to the bore, a resilient bushing secured to each of said bosses, a spring member having a flat face thereon and having its ends secured in fixed spaced relation to the frame member, said spring member having a central aperture therethrough between said ends, and a plurality of support elements secured to said flat face of said spring member and having portions engaging said bushings to resiliently support said housing on said spring member with the bore of said housing and the aperture of said spring in alignment.

4. A hanger for resiliently and rotatably supporting a propeller shaft for passage through an aperture in a frame comprising a housing having a bore therethrough and bosses at right angles to the bore, an elongated spring member extending perpendicular to the axis of said shaft and having its ends secured to the frame member in fixed spaced relation thereto on opposite sides of said frame aperture, a plurality of support elements secured to said spring intermediate the ends thereof and having portions retainingly engaging said bosses, and means in said housing bore for rotatably supporting the propeller shaft, said spring member being deflectable to permit substantial axial movement of said housing and said shaft, and said bosses accommodating pivotal movement of said shaft relative to said spring.

References Cited in the file of this patent

UNITED STATES PATENTS

| 566,544 | Smith | Aug. 25, 1896 |
| 1,799,319 | Reynolds | Apr. 7, 1931 |
| 2,450,279 | Guy | Sept. 28, 1948 |
| 2,465,785 | Berno | Mar. 29, 1949 |
| 2,682,434 | Guy | June 29, 1954 |